Patented Oct. 17, 1922.

1,432,508

UNITED STATES PATENT OFFICE.

THEODORE A. WILLARD, OF EAST CLEVELAND, OHIO, ASSIGNOR TO WILLARD STORAGE BATTERY COMPANY, OF CLEVELAND, OHIO, A CORPORATION OF WEST VIRGINIA.

PASTE FOR STORAGE-BATTERY PLATES.

No Drawing.    Application filed June 2, 1917.    Serial No. 172,364.

*To all whom it may concern:*

Be it known that I, THEODORE A. WILLARD, a citizen of the United States, residing at East Cleveland, in the county of Cuyahoga and State of Ohio, have invented a certain new and useful Improvement in Paste for Storage-Battery Plates, of which the following is a full, clear, and exact description.

This invention relates to improvements in paste for storage battery plates, especially negative plates, and has for its object to provide a paste having mixed with the active material a substance or material which will increase or maintain the capacity of the plates.

In carrying out my invention I mix with the lead oxide or oxides such as litharge and red lead, wood dust. The wood is first ground very fine, preferably to a fineness such that it will pass through an eighty per inch screen, and a small quantity of wood dust is then thoroughly mixed with the regular negative paste, preferably in the proportion of six-tenths of one per cent of wood dust by weight.

Of the various kinds of wood that I have tried, oak wood seems to give the best results, and this is preferably employed although other kinds of wood can be used.

The wood dust added to the paste increases very materially the capacity of the negative plates which are filled or pasted with the improved paste. It increases the porosity of the plate, and in that respect has a beneficial action, and as a result of careful experiments I believe that it liberates an energizing substance which increases or perhaps more accurately keeps up the capacity of the negative plates.

By the term "wood dust", as used herein, I mean wood dust containing its natural ingredients.

Having thus described my invention, what I claim is:

1. A paste for negative plates of storage batteries containing oxide of lead and a small percentage of wood dust.

2. A paste for negative plates of storage batteries comprising oxide of lead to which a small quantity of fine wood dust is added, and with which it is thoroughly mixed.

3. A paste for storage battery plates containing active material, and wood dust in the proportion of substantially six-tenths of one per cent by weight.

4. Paste for storage batteries containing oxide of lead and a small amount of comminuted wood in its natural state.

5. A paste for storage battery plates consisting of active material and wood dust uniformly distributed throughout the mass.

6. A paste for storage battery plates comprising active material having wood dust incorporated therein in the proportion of less than one per cent by weight.

In testimony whereof, I hereunto affix my signature.

THEODORE A. WILLARD.